J. H. FOSTER
L. J. LAWRENCE
INVENTORS.

BY John A. Graham

J. H. FOSTER
L. J. LAWRENCE
INVENTORS.

BY John G. Graham 3,214,667
CONTROLLED RECTIFIER SUPPLY FOR
MOTOR SPEED SYSTEM
John H. Foster, Dallas, and Louis J. Lawrence, Garland, Tex., assignors to Texas Instruments Incorporated, Dallas, Tex., a corporation of Delaware
Filed Jan. 31, 1962, Ser. No. 170,013
15 Claims. (Cl. 318—345)

This invention relates to controlled rectifier circuits for supplying direct current to a load from an alternating current source, and more particularly to systems for controlling the speed of D.C. shunt motors.

Control systems for D.C. motors of the type used in appliances, hand tools and shop machinery have heretofore made use of thyratrons, variable auto transformers, series resistances, or other such equipment. These prior systems have not been entirely satisfactory because of problems of space, weight, cost, heat dissipations and complexity. Previously developed control systems using PNPN controlled rectifiers have been rather elaborate in that a large number of component parts are necessary for satisfactory regulation.

It is therefore the principal object of this invention to provide improved supply circuits for shunt motors by utilizing PNPN controlled rectifiers. Another object is to provide circuits for supplying current to variable loads at a level selected by a reference voltage. A further object is to provide small, lightweight and inexpensive D.C. shunt motor control circuits adapted for maintaining a wide range of selected speeds regardless of load conditions.

In accordance with an illustrative embodiment of this invention, two bridge rectifiers having a pair of common diodes are connected across an A.C. source, with the armature of a D.C. motor connected in one bridge and the shunt field in the other. A pair of semiconductor controlled rectifiers are used in the bridge which includes the armature, and the firing angles of these rectifiers are controlled in response to the selected and actual motor speeds. In some embodiments of the invention, a reference voltage is derived from the bridge which includes the motor field. A feature of one embodiment is an arrangement for varying the field voltage inversely in response to the armature voltage. Another embodiment of the invention includes a current limiting feature which cuts off the controlled rectifiers when the armature current exceeds a selected value. In addition to the D.C. reference voltage supplied to the gates of the controlled rectifiers, a small A.C. voltage may be superimposed thereon to provide an increased range of control.

The novel features believed characteristic of this invention are set forth in the appended claims. The invention itself, however, along with further objects and advantages thereof, may best be understood by reference to the following detailed description of illustrative embodiments, when read in conjunction with the accompanying drawings, wherein:

Figure 1:
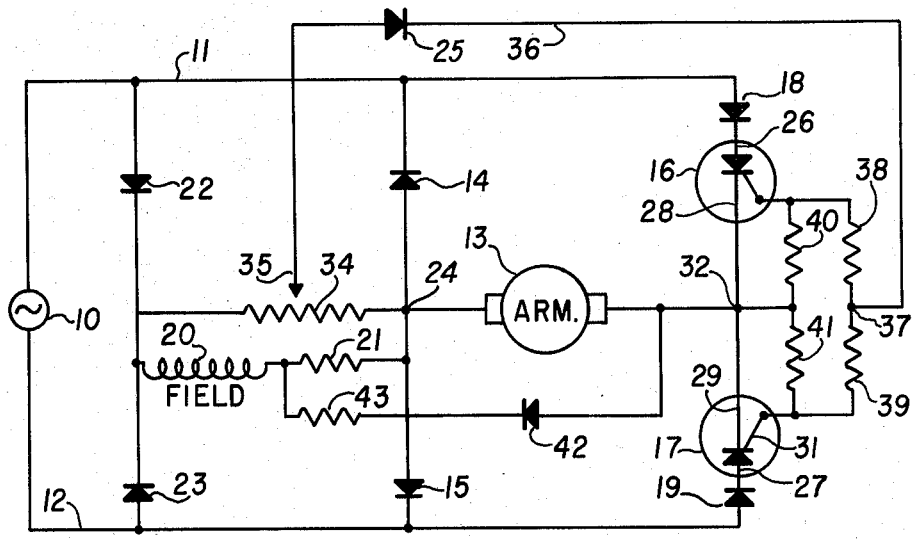
FIGURE 1 is a schematic diagram of a shunt motor control circuit incorporating features of one embodiment of this invention.

With reference to FIGURE 1, a D.C. shunt motor control circuit is shown having its armature connected in one bridge rectifier and its field in another bridge rectifier in accordance with this invention. An alternating current source 10 is connected across a pair of supply lines 11 and 12, and an armature 13 of a D.C. shunt motor is connected to the lines 11 and 12 by a full-wave bridge rectifier including a pair of diodes 14 and 15 along with a pair of controlled rectifiers 16 and 17, the latter being serially connected with a pair of diodes 18 and 19. A field winding 20, in series with a resistor 21, is likewise connected to the lines 11 and 12 by a full-wave bridge rectifier including a pair of diodes 22 and 23 along with the diodes 14 and 15. These diodes 14 and 15 are thus common to the two bridge rectifiers, with a junction 24 between these diodes forming a negative terminal for both the field and the armature. With the arrangement thus far described, it is seen that the field 20 will be supplied with full-wave-rectified direct current at a substantially constant value, while direct current will flow in the armature 13 to the extent that the controlled rectifiers 16 and 17 are conductive.

The controlled rectifiers 16 and 17 include anodes 26 and 27, cathodes 28 and 29, and gates 30 and 31, respectively. The voltages on the cathodes 28 and 29, or at a junction 32, with respect to the junction 24, will always be equal to the voltage across the armature, which will include back E.M.F. and IR drop. The firing voltages on the gates 30 and 31 are provided by an arrangement including a potentiometer 34, a tap 35 on this potentiometer being connected through a diode 25 and a line 36 to a junction 37 of a pair of resistors 38 and 39. The other ends of these resistors are connected to the gates 30 and 31, while the gates are shunted to the common point 32 by another pair of resistors 40 and 41. The voltages on the gates will thus be a full-wave-rectified waveform having a peak value determined by the setting of the tap 35 on the potentiometer 34.

With this arrangement, the average voltage across the armature will tend to be maintained at about the value selected by the tap 35. If the motor speed is low due to loading, the armature voltage will be low. The voltage difference between junction 32 and tap 35 will be applied to the gates, thus causing the controlled rectifiers to fire earlier in each half cycle. When the voltage at junction 32 is equal or exceeds voltage at tap 35, the firing of the controlled rectifiers will be delayed in each half cycle, thus, functioning as a self-balancing bridge.

For low speeds, it is preferable that the full input voltage be applied to the field for smooth operation. This is essentially the case for the circuit thus far described, since the field voltage will be diminished only by the drop across the resistor 21. To decrease the field voltage as the motor speed increases, a diode 42 and a resistor 43 are connected in series between the positive side of the armature 13 and the junction of the field 20 and the resistor 21. When the armature voltage exceeds the voltage across the resistor 21, current will flow through the voltage divider provided by the resistors 43 and 21, decreasing the effective field voltage.

Figure 2:
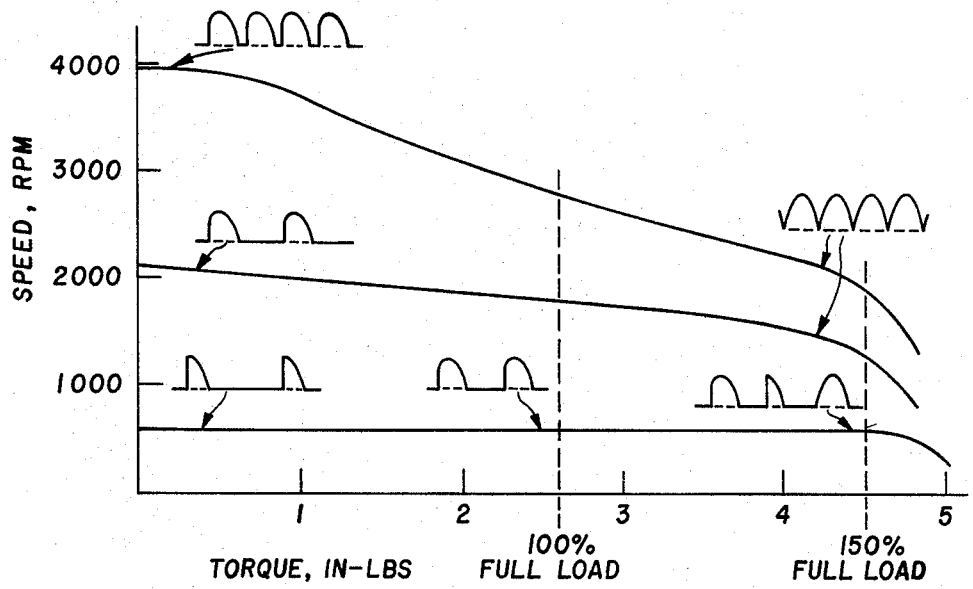
FIGURE 2 is a graphic representation of speed vs. torque for a shunt motor having a control circuit in accordance with this invention.

Although the particular values of the components utilized in the circuit of FIGURE 1 depend upon the application, an example of a practical embodiment of this circuit may have the following components:

Source 10 _____v. A.C__ 110
Diodes 14, 15, 18, 19 and 42 _____ 1N1124
Diodes 22, 23 and 25 _____ 1N2071
Controlled rectifiers 16 and 17 _____ 2N1602
Resistor 21 _____ohms__ 800
Resistors 38, 39, 40 and 41 _____do____ 1000
Resistor 43 _____do____ 390
Potentiometer 34 _____do____ 10K In FIGURE 2, illustrative speed vs. torque curves for the shunt motor control circuits of this invention are shown for various settings of the speed control potentiometer. Also, conduction waveforms for the controlled rectifiers are shown in FIGURE 2 adjacent the speed torque curves for various load conditions and speed settings. It is seen that the conduction of the controlled rectifiers may change from about 90° spaced several cycles apart up to 180° full wave, or whatever condition is necessary between these values.

Figure 3:
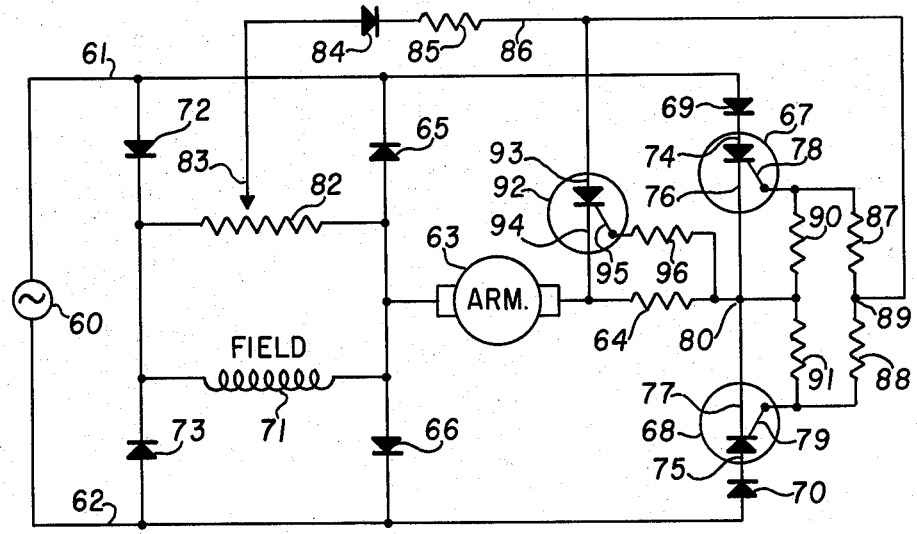
FIGURE 3 is a schematic diagram of a shunt motor control circuit incorporating the features of another embodiment of this invention, particularly the current limiting feature.

Referring now to FIGURE 3, an embodiment of the invention is shown which utilizes an overload protection arrangement. As above, an alternating current source 60 is connected to a pair of input supply lines 61 and 62, and an armature 63 of a D.C. shunt motor in series with a resistor 64 is connected to the lines 61 and 62 by a full-wave bridge rectifier. This bridge includes a pair of diodes 65 and 66 along with a pair of controlled rectifiers 67 and 68, the latter being serially connected with protective diodes 69 and 70, respectively. The shunt motor also includes a field 71 which is likewise connected to the lines 61 and 62 by a full-wave bridge rectifier including a pair of diodes 72 and 73 along with the diodes 65 and 66, the latter being common to both bridge rectifiers.

The controlled rectifiers 67 and 68 include anodes 74 and 75, cathodes 76 and 77, and gates 78 and 79, respectively, the cathodes being connected together at a junction 80. The voltages applied to the gates 78 and 79 for controlling the firing points of the devices are provided by an arrangement including a potentiometer 82. A tap 83 on this potentiometer is connected through a diode 84 and a resistor 85 to a line 86. A pair of resistors 87 and 88 connected to the gates 78 and 79 are connected together at a junction 89, this junction being connected to the line 86. The gates 78 and 79 are further connected through like resistors 90 and 91 to the common point 80. Thus the gate voltages will normally have a full-wave-rectified waveform with a peak value determined by the setting of the tap 83 on the potentiometer 82.

In order to provide overload protection for the circuit of FIGURE 3, an arrangement is included for shutting off the controlled rectifiers when the armature current reaches a certain high value such as would occur when the rotor is locked or stalled. This feature is provided by a controlled rectifier 92 which has an anode 93 connected to the line 86 and a cathode 94 connected to one side of the armature 63. A gate 95 of the controlled rectifier 92 is connected to the junction 80 by a resistor 96. When the voltage across the resistor 64, which is a measure of armature current, reaches a certain value, the gate-to-cathode voltage of the controlled rectifier 92 will be adequate to fire the device, thus shunting the line 86 or the junction 89 to the armature. This will prevent the gates 78 and 79 from reaching a firing potential, so the controlled rectifiers 67 and 68 will tend to be cut off.

An example of a practical embodiment of the circuit of FIGURE 3 may have the following components:

| | |
|---|---|
| Source 60 _____ v. A.C.____ | 110 |
| Diodes 65, 66, 69 and 70 _____ | 1N1124 |
| Diodes 72, 73 and 84 _____ | 1N2070 |
| Controlled rectifiers 67, 68 and 92 _____ | 2N1602 |
| Resistor 64 _____ ohms__ | 1 |
| Resistors 85, 87, 88, 90 and 91 _____ do____ | 1000 |
| Resistor 96 _____ do____ | 180 |
| Potentiometer 82 _____ do____ | 10K |

Figure 4:
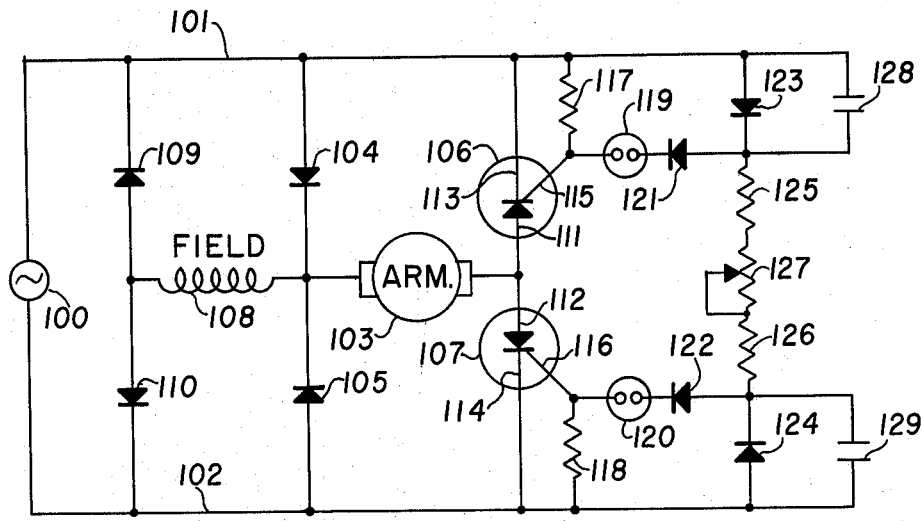
FIGURES 4 and 5 are schematic diagrams of further embodiments of the invention.

With reference to FIGURE 4, a control circuit is illustrated which utilizes a pair of bridge rectifiers having two common legs and which includes a shunt field in one bridge and an armature in the other. This circuit employs an A.C. type firing arrangement for the controlled rectifiers. As above, an A.C. source 100 is connected across a pair of input lines 101 and 102, while an armature 103 of a shunt motor is connected to these lines by a full-wave bridge including a pair of diodes 104 and 105 along with a pair of controlled rectifiers 106 and 107. A field winding 108 is connected to the input lines by a bridge including a pair of diodes 109 and 110 along with the diodes 104 and 105. The controlled rectifiers have anodes 111 and 112, cathodes 113 and 114, and gates 115 and 116, respectively, the gates being shunted to the input lines by like resistors 117 and 118. Firing pulses are applied to the gates by a network including a pair of neon bulbs 119 and 120, diodes 121, 122, 123 and 124, a pair of fixed resistors 125 and 126, a variable resistor 127, and a pair of capacitors 128 and 129.

In the operation of the circuit of FIGURE 4, it is seen that a constant direct current will be supplied to the field 108, while the armature current will depend upon the firing angles of the controlled rectifiers 106 and 107. The firing pulse for the controlled rectifier 106 is provided from the line 102 through the parallel diode 124 and capacitor 129, the resistors 125, 126 and 127, the diode 121, and the spiking neon bulb 119. Likewise, firing potentials are supplied to the controlled rectifier 107 from the line 101 through the parallel diode 123 and capacitor 128, the resistors 125, 126, and 127, the diode 122, and the neon bulb 120. The value of the resistor 127 will thus vary the firing angles of both devices equally since this portion of the two paths is common. Two RC phase shifting circuits are provided by the capacitors 128 and 129 along with the common resistances.

Representative values for the components in the circuit of FIGURE 4 may be as follows:

| | |
|---|---|
| Diodes 104 and 105 _____ | 1N1124 |
| Diodes 109, 110, 121, 122, 123, and 124 _____ | 1N2071 |
| Controlled rectifiers 106 and 107 _____ | 2N1602 |
| Resistors 117, 118, 125 and 126 _____ ohms__ | 1000 |
| Resistor 127 _____ do____ | 10K |
| Capacitors 128 and 129 _____ mfd__ | 1 |

Figure 5:
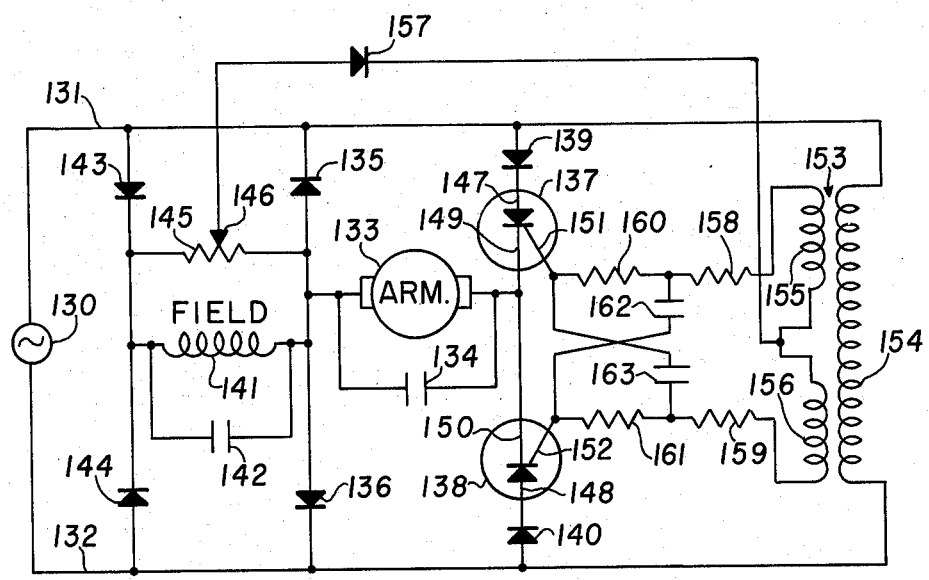

Another embodiment of the bridge type motor control of FIGURE 1 and 3 is illustrated in FIGURE 5, this circuit using both A.C. and D.C. gating. An A.C. source 130 is connected across a pair of input lines 131 and 132, while a motor armature 133, shunted by a capacitor 134, is connected to these input lines by a bridge rectifier including a pair of diodes 135 and 136 along with a pair of controlled rectifiers 137 and 138 which are in series with a pair of diodes 139 and 140. A shunt field winding 141, having a capacitor 142 connected thereacross, is connected to the input lines by a bridge including a pair of diodes 143 and 144 and the diodes 135 and 136. This bridge also has a potentiometer 145 connected across opposite terminals, and due to the capacitor 142 a relatively smooth D.C. voltage is provided across this potentiometer. A portion of this D.C. voltage is selected by a tap 146 which is connected to the controlled rectifier firing circuit as described below. The controlled rectifiers have anodes 147 and 148, cathodes 149 and 150, and gates 151 and 152, respectively. A small A.C. voltage is applied to the gates by a transformer 153 having a primary 154 connected across the lines 131 and 132 and a pair of secondaries 155 and 156. A common point of the two secondaries is connected to the tap 146 by a diode 157 to provide a D.C. reference voltage. The outer terminals of the secondaries are connected to the gates 151 and 152 through small resistors 158 and 159 in series with larger resistors 160 and 161. The junction of the resistors 158 and 160 is connected to the gate 152 by a capacitor 162, while the junction of the resistors 159 and 161 is connected to the gate 151 by a capacitor 163. The A.C. voltages across the secondaries 155 and 156 are relatively small, perhaps 3.2 volts if the source 130 is about 110 volts, and so the D.C. voltage provided by the potentiometer 145 is primarily determining, the A.C. voltage merely acting to provide a wider range of control of the firing angles.

An example of a practical embodiment of the control circuit of FIGURE 5 may have the following components:

| | |
|---|---|
| Diodes 135, 136, 139 and 140 | 1N1124 |
| Diodes 143, 144 and 157 | 1N2070 |
| Controlled rectifiers 137 and 138 | 2N1602 |
| Capacitor 134 _____ mfd | 200 |
| Capacitor 142 _____ mfd | 80 |
| Capacitors 162 and 163 _____ mfd | 20 |
| Resistors 158 and 159 _____ ohms | 150 |
| Resistors 160 and 161 _____ do | 980 |
| Resistor 145 _____ do | 10K |

While this invention has been described with reference to illustrative embodiments, this description is not meant to be construed in a limiting sense. Various modifications may be made by persons skilled in the art, and so it is contemplated that the appended claims will cover any such modifications as fall within the true scope of the invention.

What is claimed is:

1. A shunt motor control circuit comprising:
   (a) an alternating current source,
   (b) a first bridge rectifier including a diode in each of the four legs thereof and having opposite terminals connected to said source,
   (c) a field winding for said shunt motor connected across the remaining terminals of said first bridge rectifier,
   (d) a second bridge rectifier including two of said diodes from said first bridge rectifier in two of the four legs thereof and including a controlled rectifier in each of the remaining two of the four legs thereof, said second bridge rectifier having opposite terminals connected to said source,
   (e) an armature winding for said shunt motor connected across the remaining terminals of said second bridge rectifier,
   (f) and resisting means coupled to said source adapted to provide firing potentials for said controlled rectifiers at selected levels whereby a plurality of speed settings are available for said motor.

2. A shunt motor control circuit comprising:
   (a) an alternating current source having first and second terminals,
   (b) a first pair of oppositely-poled diodes connected in series between said first and second terminals,
   (c) a second pair of oppositely-poled diodes connected in series between said first and second terminals to provide a full-wave bridge rectifier with said first pair,
   (d) a field winding for said shunt motor connected between the junction of said first pair and the junction of said second pair,
   (e) a pair of oppositely-poled controlled rectifiers connected in series between said first and second terminals to provide a full-wave bridge rectifier with said second pair, each of said controlled rectifiers including an anode, a cathode and a gate, the cathodes being connected together at a junction,
   (f) an armature winding for said shunt motor connected between the junction of said cathodes and the junction of said second pair of diodes,
   (g) resistance means shunting said field winding and having a movable tap thereon to provide a reference voltage,
   (h) and means connecting said movable tap to the gates of said controlled rectifiers.

3. Apparatus according to claim 2 wherein: a first resistor is connected in series between said field winding and said junction of said second pair of diodes; and a diode and a second resistor are connected from the junction of said cathodes to said first resistor so that the field voltage will be decreased as the armature voltage increases.

4. Apparatus according to claim 2 wherein a control device shunts said tap to said armature winding and is effective to render said controlled rectifiers nonconductive by lowering the gate voltages thereon when the armature winding current exceeds a selected level.

5. Apparatus according to claim 2 wherein: a resistor is connected in series between said armature winding and the junction of said cathodes, and a controlled rectifier having an anode, a cathode and a gate shunts the gates and cathodes of said pair of controlled rectifiers, said anode being coupled to said tap, said cathode being coupled to said armature winding, and said gate being coupled to said resistor whereby said controlled rectifier will fire when the armature winding current exceeds a selected value.

6. Apparatus according to claim 2 wherein: said field winding and said armature winding are shunted by capacitors; and A.C. voltages derived from said source are applied to said gates in addition to said reference voltage.

7. Power supply apparatus comprising:
   (a) an alternating current source,
   (b) first means including said source adapted to provide a rectified voltage between a first output terminal and a common terminal,
   (c) second means including said source adapted to provide a rectified voltage between a second output terminal and said common terminal,
   (d) a potentiometer connected between said first output terminal and said common terminal and having a movable tap,
   (e) a controlled rectifier having an anode, a cathode and a gate, said cathode being connected to said second output terminal,
   (f) a varying load connected between said cathode and said common terminal,
   (g) and means connecting said tap to said gate.

8. Apparatus according to claim 7 wherein: said first means is a full-wave bridge rectifier; said second means is a full-wave bridge rectifier including said controlled rectifier, two of the legs of said first and second means being common; said variable load is a motor armature; and a motor field is connected between said first output terminal and said common terminal.

9. A controllable power supply system comprising a first full-wave rectifier bridge having two legs each provided with a semiconductor diode rectifier and two legs each provided with a semiconductor controlled rectifier having anode, cathode and gate electrodes, the input of said first bridge connected to a source of alternating current, the output provided by the junction of the diodes and the junction of the controlled rectifiers of said first bridge supplying direct current to a load, a second full-wave rectifier bridge having four legs provided with four semiconductor diode rectifiers, two diodes being identical with the two diodes of said first bridge, the input thereof connected to said soure of alternating current, a resistor having a movable tap placed across the output of said second bridge, the tap connected to the gate electrodes of the controlled rectifiers.

10. A controllable power supply system, comprising a first full-wave rectifier bridge having two legs each provided with a semiconductor diode rectifier and two legs each provided with a semiconductor controlled rectifier having anode, cathode and gate electrodes, the input of said first bridge connected to a source of alternating current, the output provided by the junction of the diodes and the junction of the controlled rectifiers of said first bridge supplying direct current to a first load, a second full-wave rectifier bridge having four legs provided with four semiconductor diode rectifiers, two diodes being identical with the two diodes of said first bridge, the input thereof connected to said source of alternating current, the output of said second bridge supplying direct current to a second load, a resistor having a movable tap placed across the output of said second bridge, the tap connected to the gate electrodes of the controlled rectifiers, a voltage divider having two resistors placed in series across the first load, the second load inserted between the junction of the two resistors of said voltage divider and one output terminal of said second bridge.

11. A controllable power supply system comprising a first full-wave rectifier bridge having two legs each provided with a semiconductor diode rectifier and two legs each provided with a semiconductor controlled rectifier having anode, cathode and gate electrodes, the input of said first bridge connected to a source of alternating current, the output provided by the junction of the diodes and the junction of the controlled rectifiers of said first bridge supplying direct current to the armature of a motor, a second full-wave rectifier bridge having four legs provided with four semiconductor diode rectifiers, two diodes being identical with the two diodes of said first bridge, the input thereof connected to said cource of alternating current, the output of said second bridge supplying direct current to the field winding of the motor, a resistor having a movable tap, said resistor placed across the output of said second bridge, the tap connected to the gate electrodes of the controlled rectifiers through a means of a first voltage divider comprising resistors, a second voltage divider having two resistors placed in series across the armature, the field winding inserted between the junction of the resistors of the voltage divider and an output terminal of said second bridge.

12. A controllable power supply system comprising a first full wave rectifier bridge having two legs each provided with a semiconductor controlled rectifier having anode, cathode and gate electrodes, the input of said first bridge connected to a source of alternating current, the output provided by the junction of the diodes and the junction of the controlled rectifiers of said first bridge supplying direct current to the armature of a motor, a second full wave rectifier bridge having four legs provided with four semiconductor diode rectifiers, two diodes being identical with the two diodes of said first bridge, the input thereof connected to said source of alternating current, the output of said second bridge supplying direct current to the field winding of the motor, a resistor having a movable tap, said resistor placed across the output of said second bridge, the tap connected to the gate electrodes of the controlled rectifiers, a voltage divider having two resistors placed in series across the armature, the field winding inserted between the junction of the resistors of the voltage divider and an output terminal of said second bridge.

13. A controllable power supply system comprising a first full wave rectifier bridge having two legs each provided with a semiconductor controlled rectifier having anode, cathode and gate electrodes connected in series with a semiconductor diode rectifier, the input of said first bridge connected to a source of alternating current, the output provided by the junction of the diodes and the junction of the controlled rectifiers of said first bridge supplying direct current to the armature of a motor, a second full wave rectifier bridge having four legs provided with four semiconductor diode rectifiers, two diodes being identical with the two diodes of said first bridge, the input thereof connected to said source of alternating current, the output of said second bridge supplying direct current to the field winding of the motor, a resistor having a movable tap, said resistor placed across the output of said second bridge, the tap connected to the gate electrodes of the controlled rectifiers, a voltage divider having two resistors placed in series across the armature, the field winding inserted between the junction of the resistors of the voltage divider and an output terminal of said second bridge.

14. A controllable power supply system comprising a first full wave rectifier bridge having two legs each provided with a semiconductor controlled rectifier having anode, cathode and gate electrodes, the input of said first bridge connected to a source of alternating current, the output provided by the junction of the diodes and the junction of the controlled rectifiers of said first bridge supplying direct current to the armature of a motor, a second full wave rectifier bridge having four legs provided with four semiconductor diode rectifiers, two diodes being identical with the two diodes of said first bridge, the input thereof connected to said source of alternating current, the output of said second bridge supplying direct current to the field winding of the motor, a resistor having a movable tap, said resistor placed across the output of said second bridge, the tap connected to the gate electrodes of the controlled rectifiers, a voltage divider having two resistors placed in series across the armature, the field winding inserted between the junction of the resistors of the voltage divider and an output terminal of said second bridge and a diode connected in series to said voltage divider to block the field voltage to the armature.

15. A controllable power supply system in accordance with claim 14, wherein the semiconductor controlled rectifiers are silicon PNPN controlled rectifiers.

References Cited by the Examiner

UNITED STATES PATENTS

| | | | |
|---|---|---|---|
| 2,522,520 | 9/50 | Knanth et al. | 318—345 X |
| 2,537,676 | 1/51 | Knanth et al. | 318—345 |
| 2,899,620 | 8/59 | Anger et al. | 318—331 |
| 3,095,534 | 6/63 | Cockrell | 318—331 X |

OTHER REFERENCES

Applied Electronics, N.Y., The Technology Press, 1943, pp. 260, 271.

ORIS L. RADER, *Primary Examiner.*